No. 679,995. Patented Aug. 6, 1901.
P. F. SCHAFFER.
BALL BEARING HUB.
(Application filed Feb. 26, 1901.)
(No Model.)
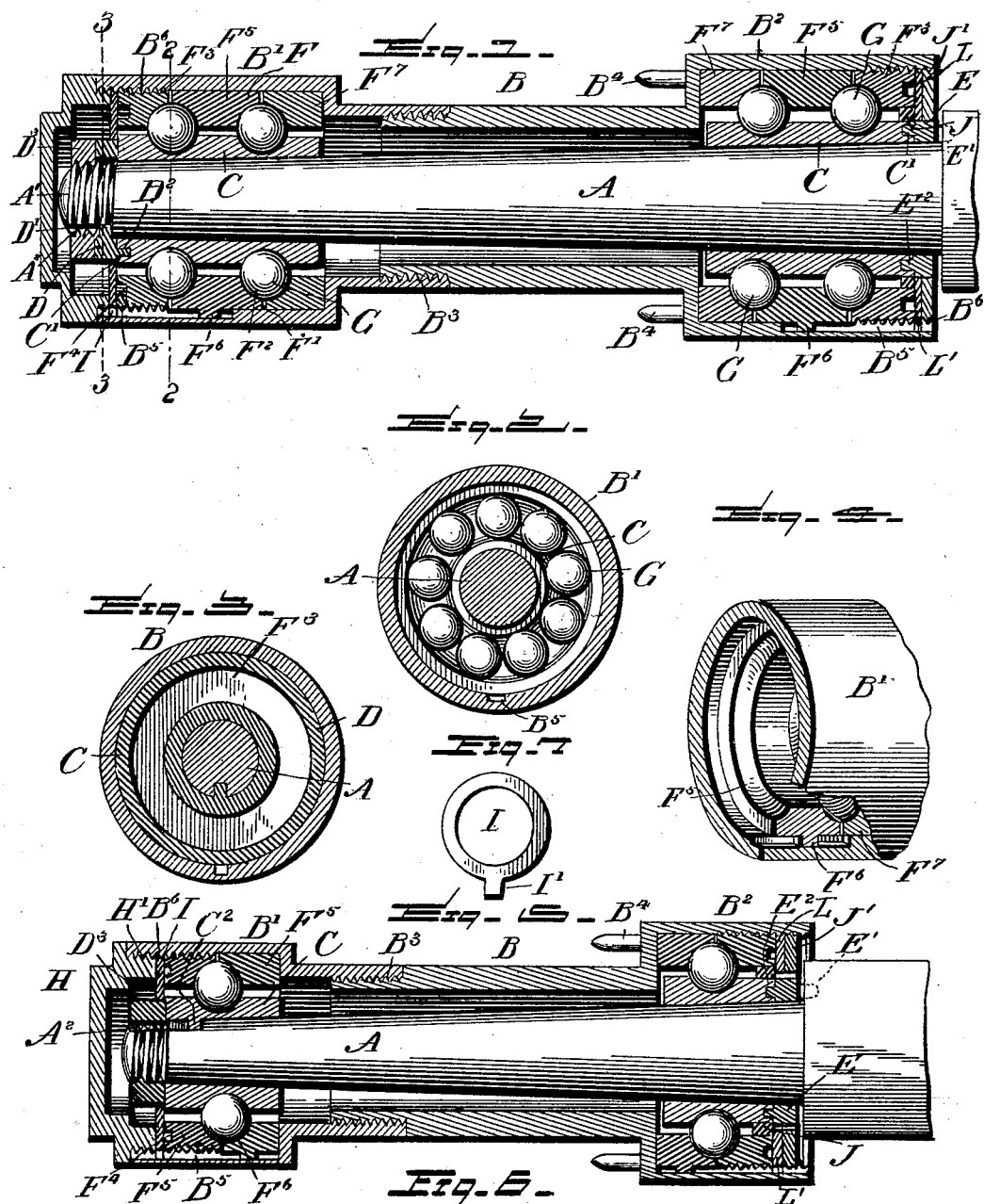
WITNESSES:
INVENTOR
Philip F. Schaffer,
BY E. B. Stocking
Attorney

UNITED STATES PATENT OFFICE.

PHILIP F. SCHAFFER, OF PHILADELPHIA, PENNSYLVANIA, ASSIGNOR OF ONE-HALF TO ROBERT J. McNALLY, OF SAME PLACE.

BALL-BEARING HUB.

SPECIFICATION forming part of Letters Patent No. 679,995, dated August 6, 1901.

Application filed February 26, 1901. Serial No. 48,934. (No model.)

*To all whom it may concern:*

Be it known that I, PHILIP F. SCHAFFER, a citizen of the United States, residing at Philadelphia, in the county of Philadelphia, State of Pennsylvania, have invented certain new and useful Improvements in Ball-Bearing Hubs, of which the following is a specification, reference being had therein to the accompanying drawings.

This invention relates to ball-bearing hubs, and particularly to means for applying such bearing to the axle and hub of a wheel.

The invention has for an object to provide novel means for securing a bearing-sleeve against rotation upon the axle and for also holding a bearing-cone in position while permitting adjustment of the several parts to compensate for wear and permit their removal when desired.

Other and further objects and advantages of the invention will be set forth in the following description and the novel features thereof defined by the appended claims.

In the drawings, Figure 1 is a longitudinal section showing the invention applied to an axle; Fig. 2, a vertical section on the line 2 2 of Fig. 1; Fig. 3, a similar view on the line 3 3 of Fig. 1. Fig. 4 is a detail perspective with parts broken away, showing the manner of securing the bearing-cone against rotation. Fig. 5 is a longitudinal section of a modified application of the invention, in which one set of balls is used at each end of the hub. Fig. 6 is a detail perspective of the lock-nut for the bearing-sleeve, and Fig 7 is a similar view of the lock-washer.

Like letters of reference refer to like parts in the several features of the drawings.

The axle A, to which the bearing is to be applied, is provided at its end with the threaded portion $A'$, having therein a longitudinal slot $A^2$.

The casing B is formed of a front boxing $B'$ and a rear box $B^2$, which may be joined together in any desired manner—for instance, by threading $B^3$. The rear box is provided with securing-pins $B^4$, adapted to retain the same within a wooden hub by entering the material thereof. Each of these boxes is provided with a groove or way $B^5$, extending inward from the open end of the box and through the threads $B^6$ thereon. At each end of the casing a bearing-sleeve C is secured to and fitted upon the axle A and provided at its outer end with a series of sockets or wrench-holes $C'$. For the purpose of locking the front sleeve in position a washer D is provided, which is adapted to slip over the threaded portion $A'$ and has a lug $D'$ passing into the slot $A^2$ to prevent rotation of the washer. The face of this washer is provided with a lock-pin $D^2$, adapted to enter the sleeve, and thus hold the same against rotation, while the washer D is firmly held in position by means of a lock-nut $D^3$ engaging the threaded portion $A'$ of the axle. At the rear end of the casing a washer E is tightly fitted to the axle and may be provided with a pin $E'$ to enter a socket in the shoulder of the axle to hold the washer against rotation. A lock-pin $E^2$ upon the opposite face of this washer is adapted to enter the socket $C'$ in the bearing-sleeve, and thus hold the latter against rotation after it has been adjusted to the proper position.

A sectional bearing-cone F may be provided for each of the boxes and is formed with lubricating-apertures $F'$ opposite the raceways $F^2$, within which the balls G travel. The outer cone-section is provided at one face with a threaded portion $F^3$, adapted to engage the threads $B^6$ of the boxes, and with wrench-holes $F^4$. The secured or middle cone-section $F^5$ is provided with a lug $F^6$, adapted to travel in the groove $B^5$ of the case. The rear cone-section $F^7$ fits against the shoulder of the casing which forms a stop and permits an adjustment of the bearing by the threaded section of the cone. These annular sections are independent of each other, so that in assembling the bearing the back and middle sections are slipped into position and the adjustment secured by the front threaded section, while the lug upon the secured section causes the same to be positively rotated with the hub and casing.

At the outer end of the front bearing-box $B'$ a dust-cap H is applied and provided with a threaded periphery $H'$ to engage the inner face of the casing. In order to prevent this cap from moving the adjusting-cone when being screwed on, an annular lock-plate I is placed over the face of the adjusting-cone and provided with a lug I', entering the slot in the box, by which the plate is held against rotation. (See Fig. 7.)

The rear boxing is provided with a suitable packing J, between the adjusting-cone for the sleeve and the dust-guard J', threaded into the open end of the boxing B². Between this dust-guard and the adjusting-cone a lock-plate L, having a lug L', entering the groove of the box, is located to prevent movement of the cone when adjusting the guard.

In the modified application of the invention shown in Fig. 5 all of the parts are similar in construction, arrangement, and operation to that shown in Fig. 1, with the exception that one section of the bearing-cone is omitted and at the left end the groove $A^2$ is extended beneath the sleeve C, which is provided with a projection $C^2$, entering said groove, thus holding the sleeve against rotation without the use of the washer D.

From the foregoing description the operation of the several parts will be clearly understood, and it will be seen that the casing can be readily applied to a hub and the bearing members adjusted and secured by an ordinary workman. Furthermore, the construction of the lock-washer for holding the bearing-sleeve permits the convenient removal of the sleeve for any purpose desired, while the positive connection between the rotating case and one section of the bearing-cone always insures a proper movement of the balls, which prevents a disarrangement of the bearing-contact therewith, thus securing the most desirable freedom of action between the several parts. The plates between the adjusting-cones and the dust guard and cap also prevents any danger of a movement of the cones if either the guard or cap be removed for the purpose of lubricating the bearing or cleaning the same.

It will be obvious that changes may be made in the details of the construction and configuration of the several parts without departing from the spirit of the invention as defined by the appended claims.

Having described my invention and set forth its merits, what I claim, and desire to secure by Letters Patent, is—

1. In a ball-bearing for hubs, a bearing-sleeve adapted to slide upon an axle and engaged therewith against rotation, a casing having a longitudinal groove or way, a bearing-cone adapted to slide into said casing and having a projection entering said groove, balls between said sleeve and cone, and an adjusting-cone coöperating with said secured cone; substantially as specified.

2. In a ball-bearing for hubs, an axle having a slot at one end, a bearing-sleeve provided with a socket and adapted to be secured to said axle, a casing having a longitudinal groove or way, a bearing-cone having a projection entering said groove, balls between said sleeve and cone, an adjusting-cone coöperating with said secured cone, and a lock-washer for said sleeve having a projection to engage the axle and a pin to enter said sleeve; substantially as specified.

3. In a ball-bearing for hubs, an axle provided with a slot at one end, a bearing-sleeve having a socket therein and adapted to be secured to said axle, a casing having a longitudinal groove or way, a bearing-cone having a projection entering said groove, balls between said sleeve and cone, an adjusting-cone coöperating with said secured cone, a lock-washer for said sleeve having a projection to engage the axle and a pin to enter said sleeve, a closure for the end of the bearing-box, and a lock-plate between said closure and the adjusting-cone and having a lug to enter the groove of said casing; substantially as specified.

4. In a ball-bearing hub, the combination with an axle having a longitudinal groove in its outer end, of an unthreaded bearing-sleeve adapted to slide upon said axle and provided with a socket at one end, a lock-washer having a lug to enter the groove in said axle and a pin to enter a socket in the end of said sleeve, a threaded nut adapted to engage the end of the axle to hold said lock-washer in position, and a casing surrounding said sleeve provided with bearing-balls; substantially as specified.

5. In a ball-bearing hub the combination with a casing, bearing-cone and balls, of an adjusting-cone threaded into said casing, a closure threaded into said casing beyond said adjusting-cone, and a lock-plate lying between said cone and closure and having a projection to enter the casing and hold said plate against rotation; substantially as specified.

6. In a ball-bearing hub, a casing having boxes at opposite ends each having longitudinal grooves therein, bearing-cones having projections to enter said grooves, adjusting-cones threaded into said boxes, bearing-sleeves adapted to fit the axle and provided with a socket at one end, lock-washers having a pin to enter said sleeves and a lug to enter a groove in an axle, a dust-cap threaded upon the outer box, a plate between said cap and adjusting-cone, a dust-guard threaded upon the inner box, a plate between said guard and the adjacent cone having a lug to hold the plate against rotation, and bearing-balls between said sleeves and cones; substantially as specified.

In testimony whereof I affix my signature in presence of two witnesses.

PHILIP F. SCHAFFER.

Witnesses:
CHAS. J. SCHAEFER,
WINFIELD S. H. KNOPF.